United States Patent
Qiu et al.

(10) Patent No.: US 8,867,522 B2
(45) Date of Patent: Oct. 21, 2014

(54) RECEIVING APPARATUS AND METHOD FOR MULTI-FRAME SYNCHRONIZATION

(75) Inventors: Ning Qiu, Shenzhen (CN); Qiang Li, Shenzhen (CN); Wenqi Zeng, Shenzhen (CN); Tiankun Yu, Shenzhen (CN); Zhongwei Liu, Shenzhen (CN); Yannan Xing, Shenzhen (CN); Lihong Liang, Shenzhen (CN); Liwen Li, Shenzhen (CN); Feng Lin, Shenzhen (CN); Jintao Chu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 54 days.

(21) Appl. No.: 13/522,826

(22) PCT Filed: Dec. 2, 2010

(86) PCT No.: PCT/CN2010/079393
§ 371 (c)(1),
(2), (4) Date: Jul. 18, 2012

(87) PCT Pub. No.: WO2011/143905
PCT Pub. Date: Nov. 24, 2011

(65) Prior Publication Data
US 2013/0058362 A1     Mar. 7, 2013

(30) Foreign Application Priority Data

May 17, 2010    (CN) .......................... 2010 1 0184415

(51) Int. Cl.
| | |
|---|---|
| *H04J 3/06* | (2006.01) |
| *H04W 56/00* | (2009.01) |
| *H04L 7/04* | (2006.01) |
| *H04B 1/7073* | (2011.01) |
| *H04B 1/7075* | (2011.01) |

(52) U.S. Cl.
CPC ............... *H04L 7/041* (2013.01); *H04W 56/00* (2013.01); *H04L 7/042* (2013.01); *H04J 3/0605* (2013.01); *H04B 1/70735* (2013.01); *H04B 1/7075* (2013.01)
USPC .......................................................... 370/350

(58) Field of Classification Search
CPC .... H04B 1/70735; H04B 1/7073; H04B 1/69; H04J 3/0605; H04J 3/0602; H04L 7/041
USPC .................. 370/350, 342; 375/343, 340, 316; 455/39, 502
See application file for complete search history.

(56) References Cited

U.S. PATENT DOCUMENTS

| | | | | |
|---|---|---|---|---|
| 7,466,684 | B2 * | 12/2008 | Chang ........................... | 370/350 |
| 2005/0153721 | A1 * | 7/2005 | Chang ........................... | 455/502 |
| 2007/0098116 | A1 * | 5/2007 | Kim et al. ..................... | 375/343 |

OTHER PUBLICATIONS

International Search Report for PCT/CN2010/079393 dated Feb. 28, 2011.

*Primary Examiner* — Kwang B Yao
*Assistant Examiner* — Adam Duda
(74) *Attorney, Agent, or Firm* — Ling Wu; Stephen Yang; Ling and Yang Intellectual Property

(57) ABSTRACT

The present invention discloses a multi-frame synchronization method, the method comprises: for each received sub-frame, a receiver determining a probability that the received sub-frame is each of sub-frames in a multi-frame, a sub-frame with maximum probability being a state of the currently received sub-frame after N sub-frames are received. The present invention further discloses a receiving apparatus for multi-frame synchronization comprising a calculation module; wherein the calculation module is configured to calculate a probability that a received sub-frame is each of sub-frames in a multi-frame, and determine a state of the currently received sub-frame based on a sub-frame with maximum probability after N sub-frames are received. The present invention effectively achieves a position for multi-frame synchronization and low calculation complexity.

9 Claims, 7 Drawing Sheets

RECEIVING APPARATUS AND METHOD FOR MULTI-FRAME SYNCHRONIZATION

TECHNICAL FIELD

The present invention relates to the field of multi-frame synchronization in the communication and information technology, and in particular, to a receiving apparatus and method for multi-frame synchronization in a Time Division-Synchronous Code Division Multiple Access (TD-SCDMA) system.

BACKGROUND OF THE RELATED ART

TD-SCDMA, which is one of three main standards of the $3^{rd}$ generation mobile communication system (3G), has extensive application prospect. The length of each sub-frame in a TD-SCDMA downlink frame format is 5 ms, and every 4 successive sub-frames constitute 1 multi-frame. In order to correctly demodulate broadcast channel (BCH) information, after sub-frame synchronization is completed, an end user in the TD-SCDMA system must determine first an initial position of a multi-frame of the BCH in the Primary-Common Control Physical Channel (P-CCPCH). This position is indicated by quadrature phase shift keying (QPSK) modulating phase of Sync-DL codes relative to Midamble codes in a 0 time slot, wherein a sequence used for SYNC-DL phase modulation is shown in Table 1.

TABLE 1 the sequence used for the SYNC-DL phase modulation

| Name | 4 successive phases | Meaning |
|---|---|---|
| S1 | 135, 45, 225, 135 | There is P-CCPCH in 4 subsequent sub-frames |
| S2 | 315, 225, 315, 45 | There is no P-CCPCH in 4 subsequent sub-frames |

After channel estimated results of the Midamble and the SYNC-DL are obtained respectively, the existing multi-frame synchronization methods are mainly divided into the following several types:

1) Phases of the 4 successive sub-frames are directly detected.

2) Differential phase detection, that is, the phase difference between two successive sub-frames is calculated, and it is determined whether the 4 successively calculated sub-frames satisfy the condition.

3) Correlative accumulation modulus calculation, that is, estimated values are accumulated after the due phases of the sub-frames are compensated, and it is determined whether the 4 compensated and accumulated sub-frames satisfy the condition.

4) The direct BCH attempts demodulation and decoding in initial positions of different sub-frames to determinate the multi-frame. There are 4 kinds of possible initial positions of the multi-frame in total. Assuming first that a certain sub-frame is an initial sub-frame of the multi-frame, 4 successive sub-frames are demodulated and decoded. If the cyclic redundancy check (CRC) can be passed, then the assumption is correct; otherwise, assuming again demodulation and decoding in another initial position. The above-mentioned steps are repeated until correct decoding is achieved.

Initial positions of the Midamble and SYNC-DL differ by 544 chips. The direct phase detection method requires that phase resolution is 45 degrees at least, that is to say, residual frequency offset in the noise free environment must be smaller than 294 Hz. Due to influence of the noise and the residual frequency offset, practical value of the direct phase detection method is lower.

The differential phase detection is a method for performing detection using phase difference relationships between 4 successive phases of S1, phase differences of the 4 successive phases of S1 are −90, 180 and −90 respectively. The influence of frequency offset is indeed avoided using this feature, however, unfortunately, when the 4 received sub-frames are the last 2 sub-frames of S1 and the first 2 sub-frames of S2, that is to say, when phases are 225, 135, 315 and 225, calculation results of the phase differences between the 4 sub-frames are also −90, 180 and −90. Thus the differential phase detection method cannot distinguish between these two situations, and a large number of false alarms will result in.

The method of correlative accumulation modulus calculation avoids direct detection of the phases, and the sequence is detected using modulus values based on the principle that in-phase accumulation of sequences in accordance with local sequence phase difference distribution can be achieved upon correlative accumulation of the sequences. Since this uses characteristics of the phase difference in nature, in a scenario where a defect occurs in the differential correlation in S1 connecting S2, a correlative accumulated value of 4j will be obtained. The different between this result and an accumulated value of 4 obtained when S2 is aligned S1 is 90 degree phase. If the phase is not detected, then these two situations cannot be distinguished, if the phase is detected, then the problem returns to residual frequency offset of direct phase detection.

Considering the above defects existing in the three methods described above, the effect is often is not ideal due to too high false alarm rate in practical projects. The practical applications mostly adopt multi-frame synchronization methods based on BCH try at present. By attempting blind search of the BCH to find out its multi-frame boundary, demodulation and decoding in the initial position of the multi-frame are assumed randomly. If CRC of the BCH is correct, then it is believed that the BCH TTI boundary is found. If multiple CRCs of the BCH are erroneous, then initial positions of the other 3 types of multi-frames are tried in turn, until the CRC is correct. A certain CRC of the BCH may fail for the following several reasons: 1) erroneous initial position of the multi-frame; 2) being in a channel fading period; 3) too large residual frequency offset; 4) unsent BCH (S2 state). The BCH trial-and-error method cannot get rid of the reasons 2)-4). Even if multiple decoding tries are performed in the assumed position of the multi-frame, the above reasons cannot be eliminated, thereby bringing hidden danger to the system while increasing time loss of multi-frame synchronization.

According to the description of the prior art, the existing multi-frame synchronization method has some defects in robustness: the direct detection is sensitive to the frequency offset; the problem encountered by the differential phase detection and the correlative accumulation modulus calculation method is inability to distinguish a sequence combination of S1 connecting S2; the BCH decoding trial-and-error method is time-consuming and is sensitive to both the channel and the frequency offset.

Content of the Invention

A technical problem to be solved by the present invention is to provide a receiving apparatus and method for multi-frame synchronization so as to perform the multi-frame synchronization accurately, thereby overcoming defects existing in the existing schemes effectively.

The present invention provides a multi-frame synchronization method comprising:

for each received sub-frame, a receiver determining a probability that the received sub-frame is each of sub-frames in a multi-frame, a sub-frame with maximum probability being a state of the currently received sub-frame after N sub-frames are received.

A state of each received sub-frame is one of the following 8 sub-frames: St1, St2, St3, St4, St5, St6, St7 and St8, wherein St1, St2, St3 and St4 are sub-frames in a multi-frame S1, and St5, St6, St7 and St8 are sub-frames in a multi-frame S2.

For each received sub-frame, the step of the receiver determining the probability that the received sub-frame is each of the sub-frames in the multi-frame comprises: whenever the receiver receives a sub-frame, first determining phase offsets between a phase of the sub-frame and 4 possible phases, which are denoted as BM(1), BM(2), BM(3) and BM(4) respectively, and then calculating a probability that the sub-frame is each of the 8 sub-frames based on each BM value;

wherein $BM(1)=CorrC*\exp(j*(0+\frac{1}{2})*pi/2)$, and $BM(1)$ reflects an offset between the phase of the received sub-frame and 45°;

$BM(2)=CorrC*\exp(j*(1+\frac{1}{2})*pi/2)$, and $BM(2)$ reflects an offset between the phase of the received sub-frame and 135°;

$BM(3)=CorrC*\exp(j*(2+\frac{1}{2})*pi/2)$, and $BM(3)$ reflects an offset between the phase of the received sub-frame and 225°; and $BM(4)=CorrC*\exp(j*(3+\frac{1}{2})*pi/2)$, and $BM(4)$ reflects an offset between the phase of the received sub-frame and 315°.

The method further comprises: defining 8 path metrics, PM(1), PM(2), ... PM(8), the PM(i) representing the probability that the received sub-frame is a sub-frame Sti, and clearing PM(1) to PM(8) before the multi-frame synchronization.

The probability that the sub-frame is each of the 8 sub-frames is calculated based on each BM value in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for PM(1), if abs(PM(4)+BM(2))⩾abs(PM(8)+BM(2)), then PM(1)=PM(4)+BM(2); if abs(PM(4)+BM(2))<abs(PM(8)+BM(2)), then PM(1)=PM(8)+BM(2);

for PM(5), if abs(PM(4)+BM(4))⩾abs(PM(8)+BM(4)), then PM(5)=PM(4)+BM(4); if abs(PM(4)+BM(4))<abs(PM(8)+BM(4)), then PM(5)=PM(8)+BM(4); and abs represents modulus calculation for a complex number.

N⩾6.

N=8.

The method further comprises:

after N sub-frames have been received, an index of a PM with maximum path metric is PMIdx, and a multi-frame in which the $N^{th}$ sub-frame is located and a position of the $N^{th}$ sub-frame in the multi-frame are determined in the following way:

SEsti=floor((PMIdx−1)/4)+1, where SEsti is a serial number of the multi-frame in which the current sub-frame is located, and PEsties=mod(PMIdx−1, 4)+1, where SEsti is a serial number of the current sub-frame in the multi-frame; and wherein floor represents round down, and mod represents remainder calculation.

The present invention further provides a receiving apparatus for multi-frame synchronization comprising a calculation module; wherein the calculation module is configured to calculate a probability that a received sub-frame is each of sub-frames in a multi-frame, and determine a state of the currently received sub-frame based on a sub-frame with maximum probability after N sub-frames are received.

A state of each received sub-frame is one of the following 8 sub-frames: St1, St2, St3, St4, St5, St6, St7 and St8, wherein St1, St2, St3 and St4 are sub-frames in a multi-frame S1, and St5, St6, St7 and St8 are sub-frames in a multi-frame S2.

The calculation module is configured to calculate the probability that the received sub-frame is each of the sub-frames in the multi-frame by, whenever the receiver receives a sub-frame, determine phase offsets between a phase of the sub-frame and 4 possible phases, which are denoted as BM(1), BM(2), BM(3) and BM(4) respectively, and then calculate a probability that the sub-frame is each of the 8 sub-frames based on each BM value;

wherein $BM(1)=CorrC*\exp(j*(0+\frac{1}{2})*pi/2)$, and $BM(1)$ reflects an offset between the phase of the received sub-frame and 45°;

$BM(2)=CorrC*\exp(j*(1+\frac{1}{2})*pi/2)$, and $BM(2)$ reflects an offset between the phase of the received sub-frame and 135°;

$BM(3)=CorrC*\exp(j*(2+\frac{1}{2})*pi/2)$, and $BM(3)$ reflects an offset between the phase of the received sub-frame and 225°; and $BM(4)=CorrC*\exp(j*(3+\frac{1}{2})*pi/2)$, and $BM(4)$ reflects an offset between the phase of the received sub-frame and 315°.

8 path metrics, PM(1), PM(2), ... PM(8), are defined, PM(i) represents the probability that the received sub-frame is a sub-frame Sti, and PM(1) to PM(8) are cleared before the multi-frame synchronization.

The calculation module is configured to calculate the probability that the sub-frame is each of the 8 sub-frames based on each BM value in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for PM(1), if abs(PM(4)+BM(2))⩾abs(PM(8)+BM(2)), then PM(1)=PM(4)+BM(2); if abs(PM(4)+BM(2))<abs(PM(8)+BM(2)), then PM(1)=PM(8)+BM(2);

for PM(5), if abs(PM(4)+BM(4))⩾abs(PM(8)+BM(4)), then PM(5)=PM(4)+BM(4); if abs(PM(4)+BM(4))<abs(PM(8)+BM(4)), then PM(5)=PM(8)+BM(4); and abs represents modulus calculation for a complex number.

After N sub-frames have been received, an index of a PM with maximum path metric is PMIdx, then a multi-frame in which the $N^{th}$ sub-frame is located and a position of the $N^{th}$ sub-frame in the multi-frame are determined in the following way:

SEsti=floor((PMIdx−1)/4)+1, where SEsti is a serial number of the multi-frame in which the current sub-frame is located, and PEsties=mod(PMIdx−1, 4)+1, where SEsti is a serial number of the current sub-frame in the multi-frame, floor represents round down, and mod represents remainder calculation.

To sum up, the present invention provides a receiving apparatus and method for multi-frame synchronization such that based on a state transition structure, phase information of all sub-frames is utilized fully and a position for multi-frame synchronization is obtained effectively, thus the calculation complexity is low. Both the theoretical analysis and simulation results show that performance of the receiving apparatus and method in accordance with the present invention is good in various environments and is independent of the residual frequency offset and S1/S2 distribution characteristics.

PREFERRED EMBODIMENTS OF THE PRESENT INVENTION

Figure 1:
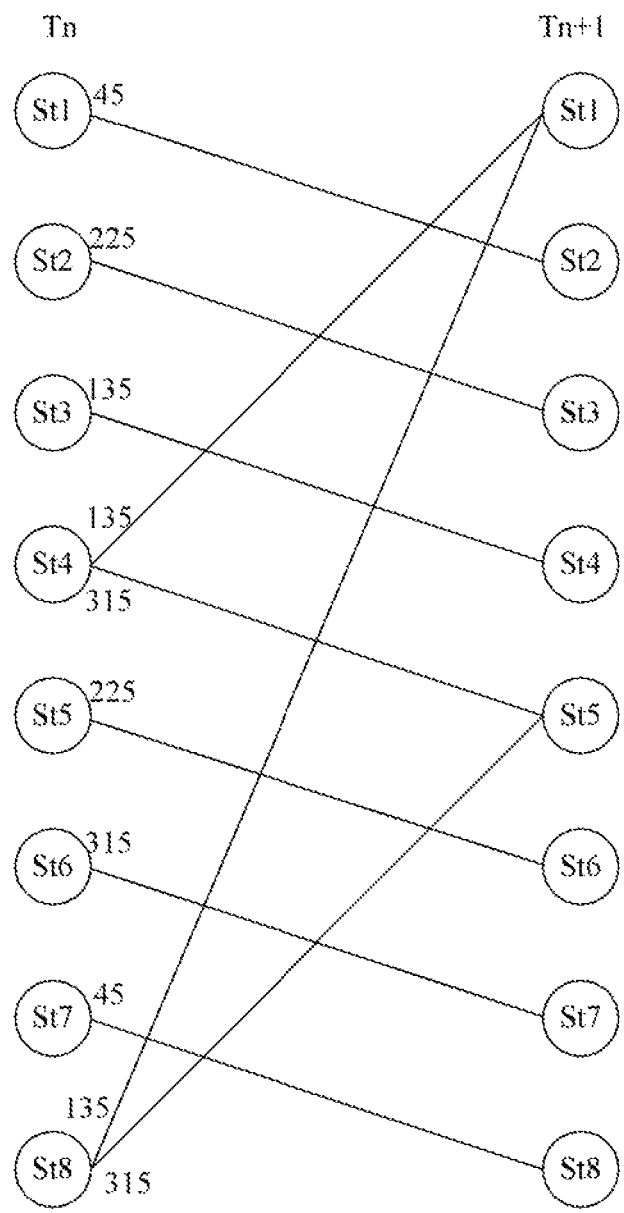
FIG. 1 is a diagram of state transition relationship of a sub-frame.

The present invention introduces a state transition structure, and provides a receiving apparatus and method for multi-frame synchronization. Embodiments of the present invention will be described in detail in conjunction with the accompanying drawings hereinafter. It should be noted that in the case of no conflict, the embodiments in the present application and features in the embodiments can be combined arbitrarily.

One embodiment provides a receiving apparatus for multi-frame synchronization comprising a calculation module.

The calculation module is configured to calculate a probability that the received sub-frame is each of sub-frames in a multi-frame, and determine a state of the currently received sub-frame based on a sub-frame with maximum probability after N sub-frames are received.

Specifically, a state of each received sub-frame is one of the following 8 sub-frames: St1, St2, St3, St4, St5, St6, St7 and St8, wherein St1, St2, St3 and St4 are sub-frames in a multi-frame S1, and St5, St6, St7 and St8 are sub-frames in a multi-frame S2.

The calculation module is configured to calculate the probability that the received sub-frame is each of the sub-frames in the multi-frame by, whenever the receiver receives a sub-frame, determine phase offsets between a phase of the sub-frame and 4 possible phases, which are denoted as BM(1), BM(2), BM(3) and BM(4) respectively, and then calculate a probability that the sub-frame is each of the 8 sub-frames based on each BM value;

wherein BM(1)=CorrC*exp(j*(0+½)*pi/2), and BM(1) reflects an offset between the phase of the received sub-frame and 45°;

BM(2)=CorrC*exp(j*(1+½)*pi/2), and BM(2) reflects an offset between the phase of the received sub-frame and 135°;

BM(3)=CorrC*exp(j*(2+½)*pi/2), and BM(3) reflects an offset between the phase of the received sub-frame and 225°; and BM(4)=CorrC*exp(j*(3+½)*pi/2), and BM(4) reflects an offset between the phase of the received sub-frame and 315°.

Further, 8 path metrics, PM(1), PM(2), . . . PM(8), are defined, PM(i) represents the probability that the received sub-frame is a sub-frame Sti, and PM(1) to PM(8) are cleared before the multi-frame synchronization.

The calculation module is configured to calculate the probability that the sub-frame is each of the 8 sub-frames based on each BM value in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for PM(1), if abs(PM(4)+BM(2))⩾abs(PM(8)+BM(2)), then PM(1)=PM(4)+BM(2); if abs(PM(4)+BM(2))<abs(PM(8)+BM(2)), then PM(1)=PM(8)+BM(2);

for PM(5), if abs(PM(4)+BM(4))⩾abs(PM(8)+BM(4)), then PM(5)=PM(4)+BM(4); if abs(PM(4)+BM(4))<abs(PM(8)+BM(4)), then PM(5)=PM(8)+BM(4); and abs represents modulus calculation for a complex number.

After N sub-frames have been received, an index of a PM with maximum path metric is PMIdx, and a multi-frame in which the N$^{th}$ sub-frame is located and a position of the N$^{th}$ sub-frame in the multi-frame are determined in the following way:

SEsti=floor((PMIdx−1)/4)+1, where SEsti is a serial number of the multi-frame in which the current sub-frame is located, and PEsties=mod(PMIdx−1, 4)+1, where SEsti is a serial number of the current sub-frame in the multi-frame.

N⩾6, and preferably, N=8.

One embodiment provides a multi-frame synchronization method comprising for each received sub-frame, a receiver determining a probability that the received sub-frame is each of sub-frames in a multi-frame, a sub-frame with maximum probability being a state of the currently received sub-frame after N sub-frames are received.

Assuming that data of a certain sub-frame is received currently, and the sub-frame certainly is a sub-frame in a multi-frame position S1 or S2, then the sub-frame has 8 possible states. The 8 states of any sub-frame are numbered according to names shown in the following table, and are denoted as St1-St8.

TABLE 2

| State number of the sub-frame | | |
| --- | --- | --- |
| Name | Phase | State |
| S1 | 135 | St1 |
|  | 45 | St2 |
|  | 225 | St3 |
|  | 135 | St4 |
| S2 | 315 | St5 |
|  | 225 | St6 |
|  | 315 | St7 |
|  | 45 | St8 |

N⩾6, and preferably, N=8.

Transition relationships between the 8 states are shown in FIG. 1.

Tn is the n$^{th}$ received sub-frame.

Since the present invention is not designed for a channel estimation method, a simple way where the strongest path is determined using downlink synchronization codes under single sampling and CorrC is obtained using a channel coefficient in the path is adopted herein.

Figure 2:
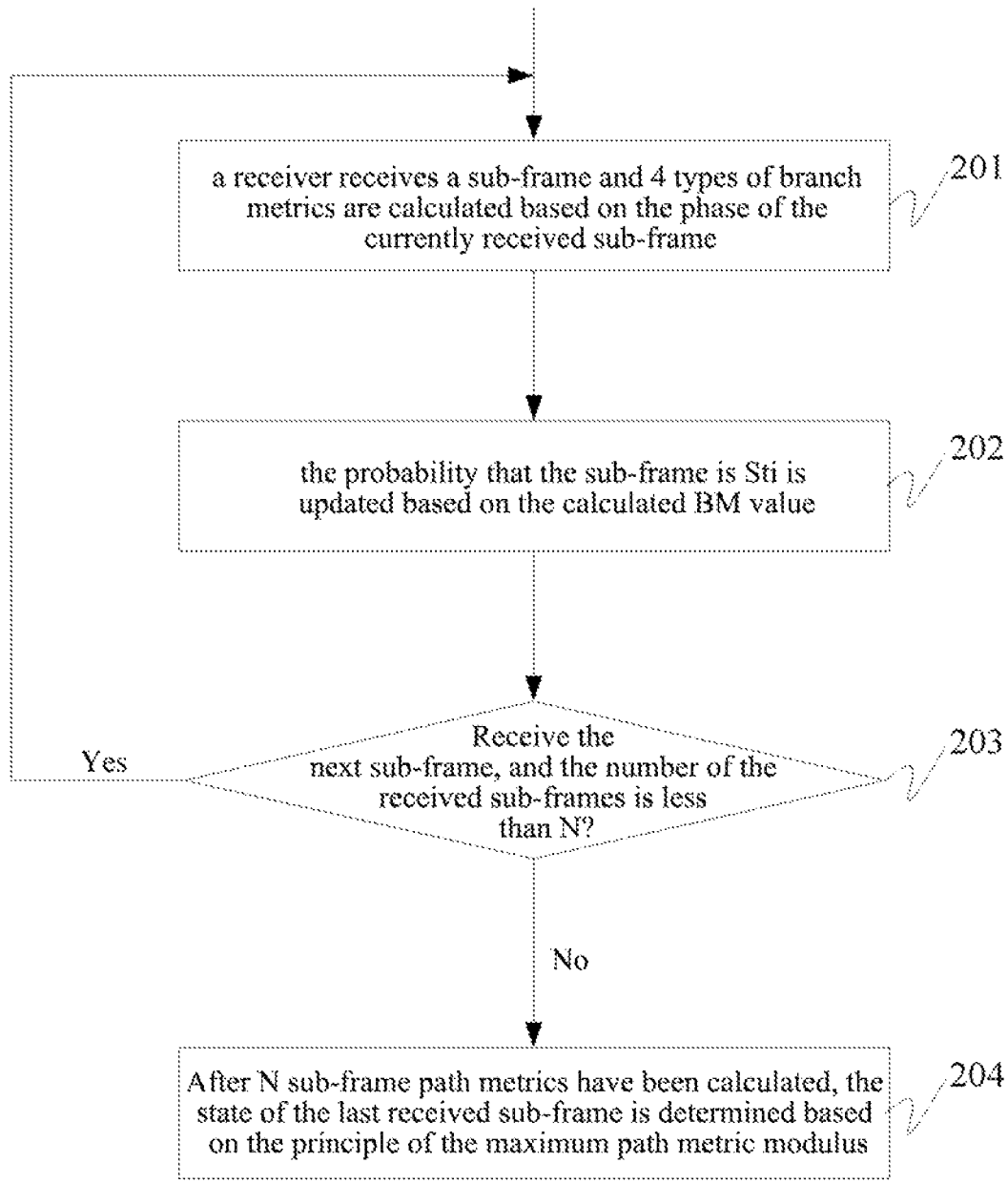
FIG. 2 is a flow chart of a method in accordance with the present invention.

8 path metrics, PM(1), PM(2), . . . PM(8), are defined, PM(i) represents the probability that the received sub-frame is a sub-frame Sti, and PM(1) to PM(8) are cleared before the multi-frame synchronization (all PMs are 0 at time T0). Steps of the embodiment in accordance with the present invention are shown in FIG. 2.

In step 201, a receiver receives a sub-frame and 4 types of branch metrics are calculated based on the phase of the currently received sub-frame, that is, phase offsets between the phase of the sub-frame and the 4 sub-frames are calculated.

BM(1)=CorrC*exp(j*(0+½)*pi/2), and BM(1) reflects an offset between the phase of the received sub-frame and 45°;

BM(2)=CorrC*exp(j*(1+½)*pi/2), and BM(2) reflects an offset between the phase of the received sub-frame and 135°;

BM(3)=CorrC*exp(j*(2+½)*pi/2), and BM(3) reflects an offset between the phase of the received sub-frame and 225°; and BM(4)=CorrC*exp(j*(3+½)*pi/2), and BM(4) reflects an offset between the phase of the received sub-frame and 315°;

where CorrC is a phase estimated value obtained using channel estimation, and the method is consistent with the process in the prior art.

j is an imaginary number unit, is defined as the square root of −1 and is used for representing an imaginary number part of a complex number. SycDLCT (Pathpos) is a channel phase calculated using downlink synchronization codes, MidabCT (PathPos) is a channel phase calculated using intermediate codes, and conj is conjugate operation of the complex number. SycDLCT(PathPos)*conj(MidabCT(PathPos)) implements the process of obtaining the phase estimated value using channel estimation by the existing method in the prior art.

CorrC=SycDLCT(PathPos)*conj(MidabCT(PathPos)).

In step 202, the probability that the sub-frame is Sti is updated based on the calculated BM value, that is, PM(1) to PM(8) are updated;

As shown in FIG. 1, PM(i) is updated in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for the PM(1), if abs(PM(4)+BM(2))⩾abs(PM(8)+BM(2)), then PM(1)=PM(4)+BM(2); otherwise, PM(1)=PM(8)+BM(2);

if abs(PM(4)+BM(2))⩾abs (PM(8)+BM(2)), it is shown that St1 is obtained by jump of the sub-frame with a phase of 135° received by St4; abs(PM(4)+BM(2))<abs(PM(8)+BM(2)), it is shown that St1 is obtained by jump of the sub-frame with a phase of 135° received by St1.

For the PM(5), if abs (PM(4)+BM(4))⩾abs (PM(8)+BM(4)), then PM(5)=PM(4)+BM(4), otherwise, PM(5)=PM(8)+BM(4).

abs represents modulus calculation of a complex number.

In path metrics of the St1 and St5 state, an alternative path metric with greater modulus value in two possible paths is remained, and other St states are calculated directly. Using this method, the number of the path metrics required to be calculated over time is always 8, and will not be increased with the number of times.

In step 203, the next sub-frame is received, if the number of the received sub-frames is less than N, then step 201 is executed, otherwise step 204 is executed.

In step 204, after N sub-frame path metrics have been calculated, the state of the last received sub-frame is determined based on the principle of the maximum path metric modulus. Thus the position in the multi-frame in which the current sub-frame is located is determined and the multi-frame synchronization process is completed.

[PMMax, PMIdx]=max(abs(PM)), by which PM with the maximum path metric modulus is selected, where PMIdx is an index of PM and max ( ) represents calculation of the maximum value.

Whether the multi-frame in which the current sub-frame is located is S1 or S2 is determined by:

SEsti=floor((PMIdx−1)/4)+1, where floor represents round down, the obtained SEsti is the serial number of he multi-frame in which the current sub-frame is located, that is, when SEsti is 1, the multi-frame in which the current sub-frame is located is S1, when SEsti is 2, the multi-frame in which the current sub-frame is located is S2.

Which sub-frame is the current sub-frame is determined by PEsti=mod(PMIdx−1, 4)+1, where mod represents remainder calculation operation, and the obtained SEsti is the serial number of the multi-frame in which the current sub-frame is located.

The subsequent simulation shows that if the value of N is 8, more ideal performance can be obtained. Since storage space and calculation required by each sub-frame are very small, evaluation of the storage space and calculation is omitted here.

Simulation and comparison are performed on the multi-frame synchronization performance method in various scenarios using typical parameters hereinafter. After multi-frame synchronization for N sub-frames, whether the last sub-frame reported is S1 or S2 is determined and the position of the sub-frame in the multi-frame is determined. The multi-frame synchronization is determined to be successful only when these two reported values are correct.

First of all, the multi-frame synchronization performance method in the Additive White Gaussian Noise (AWGN) channel is analyzed. The signal-to-noise ratio (SNR) is defined as a ratio of signal power to noise power in the DwPTS part. The number of simulations of each sampling point is 1000 estimations in the figure. Each estimation passes through N sub-frames, in which S1 and S2 sequences sent practically are selected randomly, and the position of the initial sub-frame in S1 or S2 is also selected randomly. The channel estimation adopts a simple way where the strongest path is determined using downlink synchronization codes under single sampling and CorrC is obtained using a channel coefficient in the path.

Figure 3:
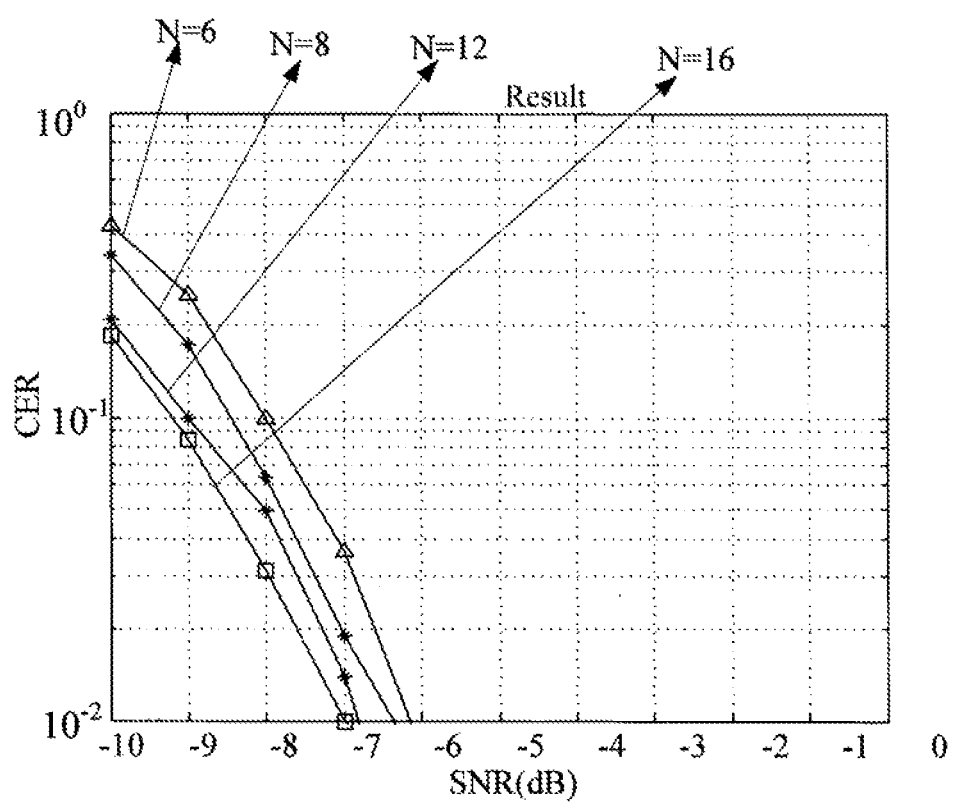
FIG. 3 illustrates a relationship between the number of sub-frames and multi-frame synchronization performance.

FIG. 3 simulates the relationship between the number of sub-frames and the multi-frame synchronization performance. The value of N is 6, 8, 12 and 16 respectively, and considering great influence of reliability of the multi-frame synchronization on the system, the number of the sub-frames below 6 is not tried here. It can be seen that with the increase of the number of the sub-frames, the multi-frame synchronization performance is improved progressively. Considering that when N is 8, the error probability has been lower than 1% when the signal-to-noise ratio is −6 dB, and the performance is good enough to meet the existing system's requirements for the performance, therefore the number of multi-frames in the subsequent simulation is determined to be 8.

Figure 4:
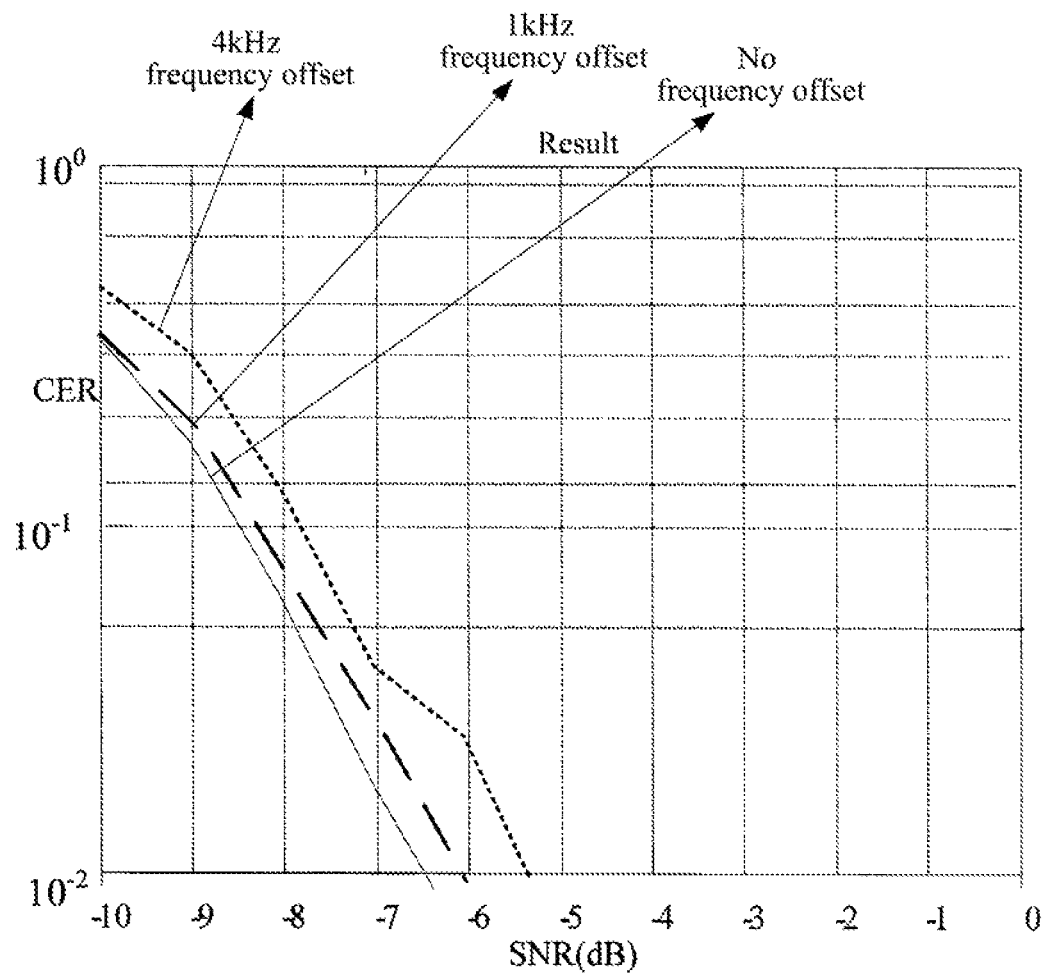
FIG. 4 illustrates influence of residual frequency offset on multi-frame synchronization performance.

It can be known from the theoretical analysis that the method itself is unrelated to the frequency offset. The simulation result of FIG. 4 shows that the method is insensitive to the residual frequency offset, obvious degradation in the performance under a frequency offset of 1 kHz does not occur, and in the scenario of a large frequency offset of 4 kHz, decline of channel estimation precision causes loss of the multi-frame synchronization performance indirectly, but this is still relatively ideal.

Figure 5:
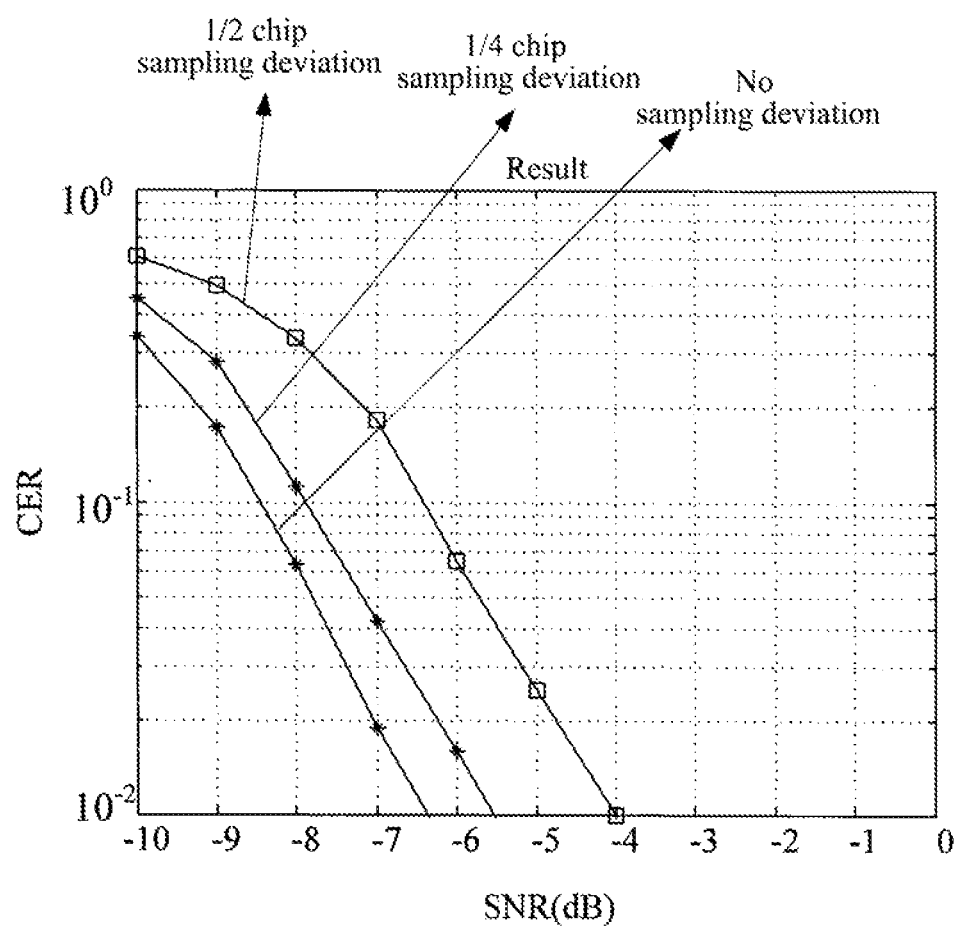
FIG. 5 illustrates influence of sampling deviation on multi-frame synchronization performance.

Since the channel estimation adopts single sampling, the path split caused by the sampling deviation reduces the signal-to-noise ratio of the strongest path such that the multi-frame synchronization performance determined by the strongest path decreases to some extent, as shown in FIG. 5. The analysis shows that the performance degradation corresponds to decreased degree of the signal-to-noise ratio of the strongest path.

Figure 6:
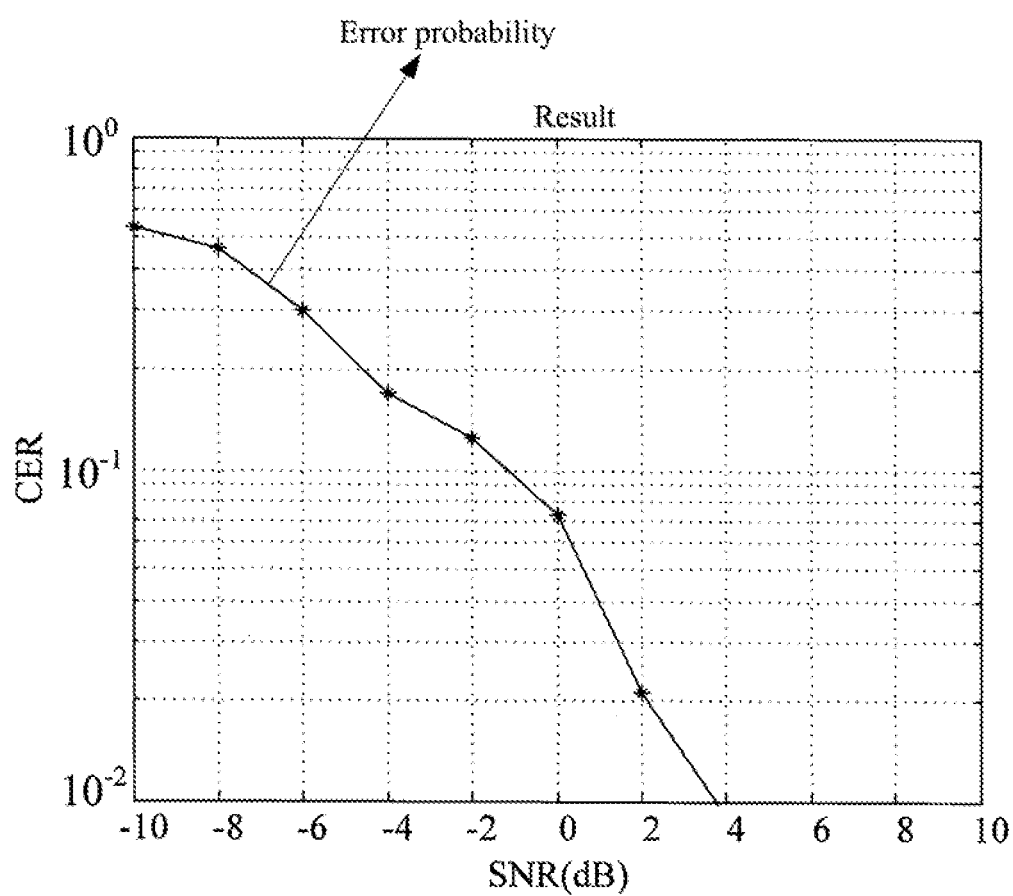
FIG. 6 illustrates multi-frame synchronization performance in a Case1 channel.
Figure 7:
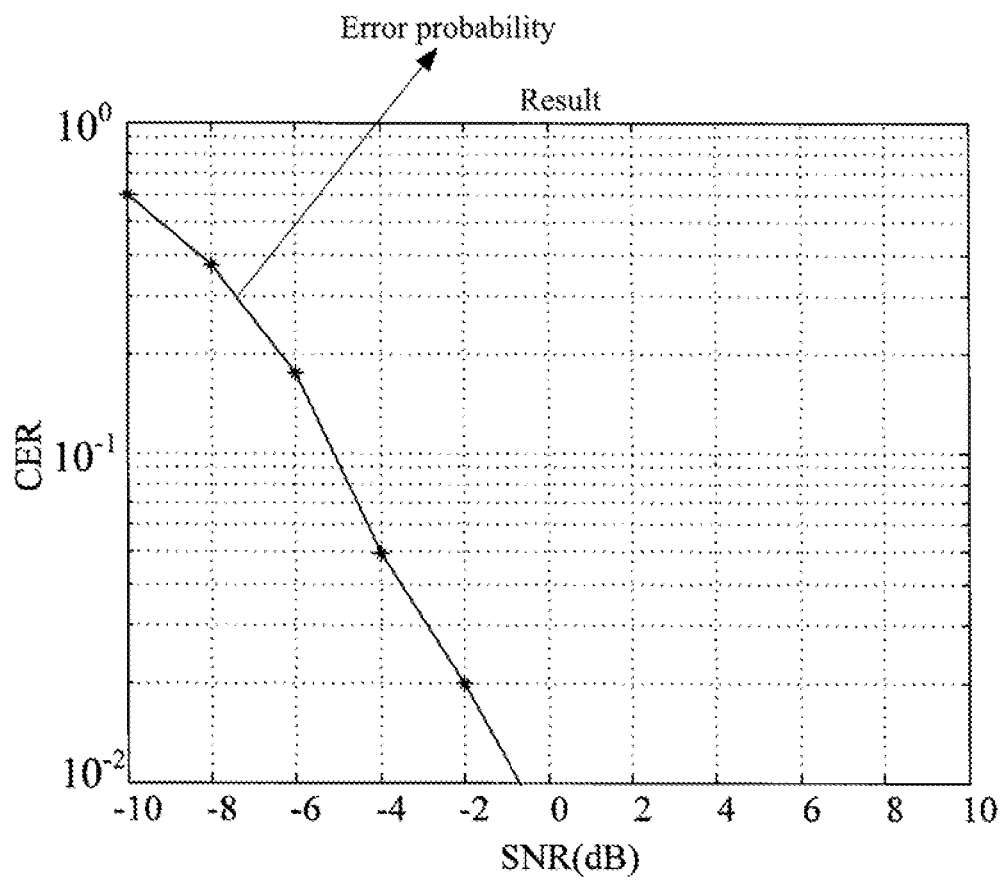
FIG. 7 illustrates multi-frame synchronization performance in a Case3 channel.

The multi-frame synchronization performance in the Case1 and Case3 channels is simulated respectively in FIG. 6 and FIG. 7, wherein the signal-to-noise ratios required to reach the error probability of 1% are 4 dB and 0 dB respectively, which are much lower than a SNR interval required for cell searching and correct demodulation.

Since a multi-frame phase is distinguished by the phase relationship between a synchronization code and a midable sequence used by the TD-SCDMA and its 51 and S2 sequences are relatively special, so several existing multi-frame synchronization methods based on phase are not reliable enough. In addition, the BCH trial-and-error methods used by the current projects have problems, such as, time-consuming, depending on the residual frequency offset and the BCH distribution, etc., thus they are not ideal enough.

In the present invention, based on a state transition structure, phase information of all sub-frames is utilized fully and a position for multi-frame synchronization is obtained effectively, thus the calculation complexity is low. Both the theoretical analysis and simulation results show that performance of the receiving apparatus and method in accordance with the present invention is good in various environments and is independent of the residual frequency offset and S1/S2 distribution characteristics.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

The present invention provides a receiving apparatus and method for multi-frame synchronization such that based on a state transition structure, phase information of all sub-frames is utilized fully and a position for multi-frame synchronization is obtained effectively, thus the calculation complexity is low. Both the theoretical analysis and simulation results show that performance of the receiving apparatus and method in accordance with the present invention is good in various environments and is independent of the residual frequency offset and S1/S2 distribution characteristics.

What we claim is:

1. A multi-frame synchronization method comprising:
for each received sub-frame, a receiver calculating a probability that the received sub-frame is a respective sub-frame of sub-frames in a multi-frame, and
after N sub-frames are received, the receiver determining that a state of currently receiving sub-frame is the state of the sub-frame with the maximum probability;
wherein N≥6.

2. The method according to claim 1, wherein
a state of each received sub-frame is one of the following 8 sub-frames: St1, St2, St3, St4, St5, St6, St7 and St8,
wherein St1, St2, St3 and St4 are sub-frames in a multi-frame S1, and St5, St6, St7 and St8 are sub-frames in a multi-frame S2; and
for each received sub-frame, the step of the receiver calculating the probability that the received sub-frame is the respective sub-frame of the sub-frames in the multi-frame comprises: whenever the receiver receives a sub-frame, first determining phase offsets between a phase of the sub-frame and 4 possible phases, which are denoted as BM(1), BM(2), BM(3) and BM(4) respectively, and then calculating a probability that the sub-frame is each of the 8 sub-frames based on each BM value;
wherein $BM(1)=CorrC*exp(j*(0+\frac{1}{2})*pi/2)$, and BM(1) reflects an offset between the phase of the received sub-frame and 45°;
$BM(2)=CorrC*exp(j*(1+\frac{1}{2})*pi/2)$, and BM(2) reflects an offset between the phase of the received sub-frame and 135°;
$BM(3)=CorrC*exp(j*(2+\frac{1}{2})*pi/2)$, and BM(3) reflects an offset between the phase of the received sub-frame and 225°; and
$BM(4)=CorrC*exp(j*(3+\frac{1}{2})*pi/2)$, and BM(4) reflects an offset between the phase of the received sub-frame and 315°.

3. The method according to claim 2, further comprising:
defining 8 path metrics, PM(1), PM(2), . . . PM(8), the PM(i) representing the probability that the received sub-frame is a sub-frame Sti, and clearing PM(1) to PM(8) before the multi-frame synchronization; and
the probability that the sub-frame is each of the 8 sub-frames is calculated based on each BM value in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for PM(1), if abs(PM(4)+BM(2))≥abs(PM(8)+BM(2)), then PM(1)=PM(4)+BM(2); if abs(PM(4)+BM(2))<abs(PM(8)+BM(2)), then PM(1)=PM(8)+BM(2);
for PM(5), if abs(PM(4)+BM(4))≥abs(PM(8)+BM(4)), then PM(5)=PM(4)+BM(4); if abs(PM(4)+BM(4))<abs(PM(8)+BM(4)), then PM(5)=PM(8)+BM(4); and
abs represents modulus calculation for a complex number.

4. The method according to claim 3, wherein N=8.

5. The method according to claim 3, further comprising:
after N sub-frames have been received, an index of a PM with maximum path metric is PMIdx, and a multi-frame in which the $N^{th}$ sub-frame is located and a position of the $N^{th}$ sub-frame in the multi-frame are determined in the following way:
SEsti=floor((PMIdx−1)/4)+1, where SEsti is a serial number of the multi-frame in which the current sub-frame is located, and PEsties=mod(PMIdx−1, 4)+1, where SEsti is a serial number of the current sub-frame in the multi-frame; and
wherein floor represents round down, and mod represents remainder calculation.

6. A receiving apparatus for multi-frame synchronization comprising a calculation module; wherein
the calculation module is configured to calculate a probability that a received sub-frame is a respective sub-frame of sub-frames in a multi-frame, and after N sub-frames are received, determine that a state of a currently received sub-frame is the state of the sub-frame with the maximum probability,
wherein N≥6.

7. The receiving apparatus according to claim 6, wherein
a state of each received sub-frame is one of the following 8 sub-frames: St1, St2, St3, St4, St5, St6, St7 and St8, wherein St1, St2, St3 and St4 are sub-frames in a multi-frame S1, and St5, St6, St7 and St8 are sub-frames in a multi-frame S2; and the calculation module is configured to calculate the probability that the received sub-frame is the respective sub-frame of the sub-frames in the multi-frame by, whenever the receiver receives a sub-frame, determine phase offsets between a phase of the sub-frame and 4 possible phases, which are denoted as BM(1), BM(2), BM(3) and BM(4) respectively, and then calculate a probability that the sub-frame is each of the 8 sub-frames based on each BM value;

wherein BM(1)=CorrC*exp(j*(0+½)*pi/2), and BM(1) reflects an offset between the phase of the received sub-frame and 45°;

BM(2)=CorrC*exp(j*(1+½)*pi/2), and BM(2) reflects an offset between the phase of the received sub-frame and 135°;

BM(3)=CorrC*exp(j*(2+½)*pi/2), and BM(3) reflects an offset between the phase of the received sub-frame and 225°; and BM(4)=CorrC*exp(j*(3+½)*pi/2), and BM(4) reflects an offset between the phase of the received sub-frame and 315°.

8. The receiving apparatus according to claim 7, wherein
8 path metrics, PM(1), PM(2), PM(8), are defined, PM(i) represents the probability that the received sub-frame is a sub-frame Sti, and PM(1) to PM(8) are cleared before the multi-frame synchronization; and the calculation module is configured to calculate the probability that the sub-frame is each of the 8 sub-frames based on each BM value in the following way:

PM(2)=PM(1)+BM(1), PM(3)=PM(2)+BM(3), PM(4)=PM(3)+BM(2);

PM(6)=PM(5)+BM(3), PM(7)=PM(6)+BM(4), PM(8)=PM(7)+BM(1);

for PM(1), if abs(PM(4)+BM(2))≥abs(PM(8)+BM(2)), then PM(1)=PM(4)+BM(2); if abs(PM(4)+BM(2))<abs(PM(8)+BM(2)), then PM(1)=PM(8)+BM(2);

for PM(5), if abs(PM(4)+BM(4))≥abs(PM(8)+BM(4)), then PM(5)=PM(4)+BM(4); if abs(PM(4)+BM(4))<abs(PM(8)+BM(4)), then PM(5)=PM(8)+BM(4); and abs represents modulus calculation for a complex number.

9. The receiving apparatus according to claim 8, wherein
after N sub-frames have been received, an index of a PM with maximum path metric is PMIdx, then a multi-frame in which the $N^{th}$ sub-frame is located and a position of the $N^{th}$ sub-frame in the multi-frame are determined in the following way:

SEsti=floor((PMIdx−1)/4)+1, where SEsti is a serial number of the multi-frame in which the current sub-frame is located, and PEsties=mod(PMIdx=1,4)+1, where SEsti is a serial number of the current sub-frame in the multi-frame, floor represents round down, and mod represents remainder calculation.

* * * * *